(12) United States Patent
Hartman

(10) Patent No.: US 11,284,625 B2
(45) Date of Patent: *Mar. 29, 2022

(54) BAKING PAN FOR TILTED CAKES

(71) Applicant: Racquel Hartman, Glendale, CA (US)

(72) Inventor: Racquel Hartman, Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/351,294

(22) Filed: Mar. 12, 2019

(65) Prior Publication Data

US 2020/0345014 A1 Nov. 5, 2020

Related U.S. Application Data

(63) Continuation of application No. 12/899,426, filed on Oct. 6, 2010, now Pat. No. 10,251,403.

(51) Int. Cl.
*A21B 3/13* (2006.01)

(52) U.S. Cl.
CPC ...................... *A21B 3/13* (2013.01)

(58) Field of Classification Search
CPC .......... A21B 3/13; A21B 3/132; A21B 3/135; A21B 5/00; A21B 3/15; A47J 37/01; A47J 43/20; A47J 27/002; A47J 36/00; A47J 45/06; A47J 27/00; A47J 36/022; A47J 47/00; A47J 47/08; A47J 47/16; B44D 3/126; B44D 3/14; E06C 7/146
USPC ................... 99/426–433, 439, 495, DIG. 15; 15/257.06; 220/570, 759, 763, 212.5, 220/762, 770, 573.1–573.3, 912; 248/318, 340; 249/117, 119, 120, 122, 249/134, 135, DIG. 1, 426–433, 439, 495, 249/DIG. 15

See application file for complete search history.

(56) References Cited

U.S. PATENT DOCUMENTS

| | | | | |
|---|---|---|---|---|
| 323,887 A | * | 8/1885 | Rutter | B28B 7/241 249/119 |
| 446,855 A | * | 2/1891 | Earle | A47J 37/0694 99/426 |
| 492,970 A | * | 3/1893 | Ramage | A47J 37/0694 99/426 |
| 495,872 A | * | 4/1893 | Ball | A21B 3/13 249/117 |
| 516,557 A | * | 3/1894 | Stone | B08B 3/006 134/108 |
| 548,499 A | * | 10/1895 | Ashmore | F24B 1/205 126/274 |
| 654,046 A | * | 7/1900 | Arthurs | A47J 37/0704 99/339 |
| 691,833 A | * | 1/1902 | Williamson | A47J 37/0694 99/426 |

(Continued)

FOREIGN PATENT DOCUMENTS

JP 69120051 A 7/1984
JP 2174641 A 7/1990

*Primary Examiner* — Eric S Stapleton
(74) *Attorney, Agent, or Firm* — Brentwood IP Law, P.C.; Shahrooz Isaac Zaghi

(57) ABSTRACT

A baking pan for baking a tilted cake for producing a whimsical or mad-hatter cake, the pan includes a rim defining a first plane and a tilted bottom defining a second plane, the rim and bottom being interconnected by a sidewall, the two planes intersect at an acute angle and a support for positioning the pan on an oven surface so that the first plane is parallel to the oven surface.

16 Claims, 4 Drawing Sheets

(56) References Cited

U.S. PATENT DOCUMENTS

| | | | | |
|---|---|---|---|---|
| 766,427 A * | 8/1904 | Crowell | A47G 19/02 | |
| | | | 220/575 | |
| 831,088 A * | 9/1906 | McGaughey | A47J 37/106 | |
| | | | 99/345 | |
| 849,290 A * | 4/1907 | Vanderbilt | A47J 37/0694 | |
| | | | 99/426 | |
| 1,388,364 A * | 8/1921 | Miller | A21B 3/13 | |
| | | | 249/117 | |
| 1,476,910 A * | 12/1923 | Naugle | A21B 3/132 | |
| | | | 249/122 | |
| 1,477,091 A * | 12/1923 | Der Heydt | A61C 9/00 | |
| | | | 249/134 | |
| 1,650,634 A * | 11/1927 | Lutzler | A47J 37/10 | |
| | | | 99/446 | |
| 1,772,699 A * | 8/1930 | Baumann | A21B 3/155 | |
| | | | 99/450 | |
| 1,837,535 A * | 12/1931 | Duffey | A22C 21/06 | |
| | | | 452/106 | |
| 1,906,603 A * | 5/1933 | Hungerford | A21B 3/155 | |
| | | | 99/450 | |
| 1,990,580 A * | 2/1935 | Chamberlin | A47J 43/18 | |
| | | | 99/426 | |
| 2,097,356 A * | 10/1937 | Truesdale | A21B 3/132 | |
| | | | 249/122 | |
| D117,732 S * | 11/1939 | Hobson | D7/359 | |
| 2,188,955 A * | 2/1940 | Nattson | A21C 15/00 | |
| | | | 248/158 | |
| 2,205,064 A * | 6/1940 | Irwin | A47J 37/0694 | |
| | | | 99/426 | |
| 2,215,611 A * | 9/1940 | Harper | A21B 3/135 | |
| | | | 99/422 | |
| 2,222,089 A * | 11/1940 | Saffell | A47J 37/0694 | |
| | | | 99/426 | |
| D126,554 S * | 4/1941 | Fletcher | D7/359 | |
| 2,299,088 A * | 10/1942 | Griffith | H05B 3/0004 | |
| | | | 99/358 | |
| D135,631 S * | 5/1943 | Naranick | D9/424 | |
| 2,360,026 A * | 10/1944 | Wall | A47J 37/0694 | |
| | | | 99/426 | |
| 2,367,448 A * | 1/1945 | Thiele | A47J 37/1295 | |
| | | | 99/409 | |
| 2,376,640 A * | 5/1945 | Wall | F24C 15/16 | |
| | | | 99/426 | |
| 2,450,716 A * | 10/1948 | Chittick | A47J 43/18 | |
| | | | 294/173 | |
| 2,459,657 A * | 1/1949 | Klein | A47J 37/067 | |
| | | | 99/393 | |
| 2,504,237 A * | 4/1950 | Weissbach | A47J 37/0694 | |
| | | | 99/426 | |
| 2,514,098 A * | 7/1950 | Shreiner | A47J 43/18 | |
| | | | 294/173 | |
| D162,041 S * | 2/1951 | Klein | D7/672 | |
| 2,565,046 A * | 8/1951 | Rooth | A47G 23/06 | |
| | | | 99/450 | |
| 2,569,262 A * | 9/1951 | Sklavenitis | A47J 37/0694 | |
| | | | 99/426 | |
| 2,570,374 A * | 10/1951 | Pompa | A47J 37/1295 | |
| | | | 99/416 | |
| 2,583,913 A * | 1/1952 | Weiterschan | A47J 43/18 | |
| | | | 452/174 | |
| 2,616,360 A * | 11/1952 | Thompson | A47J 37/0694 | |
| | | | 99/427 | |
| 2,673,003 A * | 3/1954 | Stewart | A47J 36/022 | |
| | | | 220/671 | |
| 2,827,847 A * | 3/1958 | Shafter | A47J 37/0694 | |
| | | | 99/402 | |
| 2,847,933 A * | 8/1958 | Pate | A47J 43/18 | |
| | | | 249/117 | |
| 2,850,962 A * | 9/1958 | Beavers | A47J 37/0694 | |
| | | | 99/426 | |
| 2,924,168 A * | 2/1960 | Jamentz | A47J 37/0694 | |
| | | | 99/426 | |
| 2,932,059 A * | 4/1960 | Lorenzo | A47J 43/283 | |
| | | | 99/353 | |
| 2,954,729 A * | 10/1960 | Suica | A47J 43/20 | |
| | | | 99/426 | |
| 2,963,957 A * | 12/1960 | Tashman | A47J 47/005 | |
| | | | 99/421 R | |
| 3,063,360 A * | 11/1962 | Fitch | A47J 43/18 | |
| | | | 99/419 | |
| 3,110,921 A * | 11/1963 | Herbert | B44D 3/126 | |
| | | | 15/257.06 | |
| 3,140,651 A * | 7/1964 | Barnett | A47J 37/0718 | |
| | | | 99/339 | |
| 3,153,810 A * | 10/1964 | Adams | A22C 7/00 | |
| | | | 249/117 | |
| 3,157,902 A * | 11/1964 | Hardwick | B44D 3/126 | |
| | | | 15/257.06 | |
| 3,207,059 A * | 9/1965 | Hirons | A47J 37/0694 | |
| | | | 99/349 | |
| 3,237,910 A * | 3/1966 | Lavedas | A47J 43/20 | |
| | | | 249/117 | |
| 3,292,831 A * | 12/1966 | Moen | A47J 36/20 | |
| | | | 294/157 | |
| 3,307,955 A * | 3/1967 | Pirtle | A47J 43/16 | |
| | | | 426/523 | |
| 3,308,748 A * | 3/1967 | Jalbert | A47J 37/0885 | |
| | | | 99/402 | |
| 3,313,230 A * | 4/1967 | Simjian | A47J 37/0611 | |
| | | | 99/375 | |
| 3,332,340 A * | 7/1967 | Wirtz | A47J 37/1295 | |
| | | | 99/426 | |
| 3,338,486 A * | 8/1967 | Gaylor | A47J 43/18 | |
| | | | 294/167 | |
| 3,359,889 A * | 12/1967 | Young | A47J 37/049 | |
| | | | 99/426 | |
| 3,363,544 A * | 1/1968 | Bergh | A22C 25/08 | |
| | | | 99/426 | |
| 3,365,071 A * | 1/1968 | Ottinger | A47J 27/04 | |
| | | | 211/153 | |
| 3,392,665 A * | 7/1968 | Harnest | A47J 37/0694 | |
| | | | 99/426 | |
| 3,393,809 A * | 7/1968 | Brown | A23B 4/052 | |
| | | | 211/113 | |
| 3,405,631 A * | 10/1968 | Thomas, Jr. | A47J 37/0694 | |
| | | | 99/426 | |
| 3,424,076 A * | 1/1969 | Brady | A21B 5/08 | |
| | | | 99/416 | |
| 3,433,151 A * | 3/1969 | Farran | A47J 37/049 | |
| | | | 99/441 | |
| 3,511,172 A * | 5/1970 | Jones | A47J 43/18 | |
| | | | 249/120 | |
| 3,613,553 A * | 10/1971 | Popeil | A47J 37/1295 | |
| | | | 99/426 | |
| 3,632,078 A * | 1/1972 | Dashew | B28B 7/34 | |
| | | | 249/183 | |
| 3,641,616 A * | 2/1972 | Bonci | B44D 3/14 | |
| | | | 15/257.06 | |
| 3,665,843 A * | 5/1972 | Moore | A47J 37/049 | |
| | | | 99/419 | |
| 3,705,042 A * | 12/1972 | Muse | A47J 37/1295 | |
| | | | 99/426 | |
| 3,731,840 A * | 5/1973 | Beutler | B44D 3/14 | |
| | | | 220/570 | |
| 3,744,475 A * | 7/1973 | Myler | A47J 27/14 | |
| | | | 126/39 R | |
| D242,516 S * | 11/1976 | Burns, Sr. et al. | D7/409 | |
| 4,004,501 A * | 1/1977 | Guerrero | A21C 15/02 | |
| | | | 99/426 | |
| D243,380 S * | 2/1977 | Berger | D7/354 | |
| 4,009,859 A * | 3/1977 | Bangert | A21B 3/132 | |
| | | | 249/122 | |
| 4,023,702 A * | 5/1977 | McKnight | B44D 3/14 | |
| | | | 220/756 | |
| 4,034,663 A * | 7/1977 | Jenn | A47J 36/38 | |
| | | | 99/446 | |
| 4,064,797 A * | 12/1977 | Forlani | A47J 37/06 | |
| | | | 99/341 | |

(56) References Cited

U.S. PATENT DOCUMENTS

| | | | | |
|---|---|---|---|---|
| 4,107,815 A * | 8/1978 | Dumesnil, Jr. | B05C 21/00 | 118/258 |
| D249,219 S * | 9/1978 | Stence | | 99/426 |
| 4,112,916 A * | 9/1978 | Guibert | F24C 15/322 | 126/261 |
| 4,121,510 A * | 10/1978 | Frederick | A47J 36/04 | 99/425 |
| 4,127,108 A * | 11/1978 | Krohe | A47J 37/01 | 126/369 |
| 4,140,889 A * | 2/1979 | Mason, Jr. | A47J 37/10 | 219/733 |
| 4,195,747 A * | 4/1980 | Hare | A21B 3/134 | 220/23.2 |
| 4,249,666 A * | 2/1981 | Hubert | B65D 1/0276 | 215/373 |
| D261,971 S * | 11/1981 | Wokeck | | D7/359 |
| D270,785 S * | 10/1983 | White | | D12/425 |
| 4,425,368 A * | 1/1984 | Watkins | B65D 81/3453 | 206/525 |
| 4,559,869 A * | 12/1985 | Hogan | A47J 37/0694 | 211/184 |
| D282,135 S * | 1/1986 | McClelland | | D7/360 |
| 4,574,777 A * | 3/1986 | Bohl | A47J 37/10 | 126/390.1 |
| 4,583,955 A * | 4/1986 | Toloczko | A63H 33/00 | 446/467 |
| 4,886,239 A * | 12/1989 | Stimmel | F25C 1/243 | 249/117 |
| 5,072,664 A * | 12/1991 | Tienor | A47J 37/1295 | 99/353 |
| 5,094,706 A * | 3/1992 | Howe | A47J 36/04 | 156/214 |
| 5,113,549 A * | 5/1992 | Villiano | B44D 3/126 | 220/756 |
| 5,154,114 A * | 10/1992 | Chang | A47J 27/002 | 126/373.1 |
| 5,162,628 A * | 11/1992 | Chartrain | A47J 37/041 | 219/685 |
| 5,341,953 A * | 8/1994 | Forester | A47G 19/02 | 220/575 |
| D359,879 S * | 7/1995 | Fielding | | D7/354 |
| 5,537,917 A * | 7/1996 | Schiffer | A47J 37/01 | 99/442 |
| D392,884 S * | 3/1998 | Hayes | | D9/431 |
| 5,878,656 A * | 3/1999 | Fletcher | A47J 37/101 | 220/669 |
| 5,921,173 A * | 7/1999 | Grycan | A47J 37/01 | 126/390.1 |
| 5,964,370 A * | 10/1999 | Rust, Jr. | F24F 1/0007 | 220/571 |
| 6,047,845 A * | 4/2000 | Rapaz | A47G 19/02 | 220/501 |
| 6,131,506 A * | 10/2000 | Kemper | A47J 36/022 | 99/425 |
| D442,831 S * | 5/2001 | Jacobs | | D7/584 |
| 6,231,910 B1 * | 5/2001 | Ellingsworth | A21B 3/132 | 249/119 |
| D444,604 S * | 7/2001 | Hoffert | | D32/53.1 |
| 6,287,619 B1 * | 9/2001 | Khan | A47J 37/01 | 206/551 |
| 6,431,392 B1 * | 8/2002 | Eisenbeisz | B44D 3/126 | 220/737 |
| D473,758 S * | 4/2003 | Wilson | | D7/587 |
| 6,557,720 B2 * | 5/2003 | Tosdale | A47J 27/12 | 206/518 |
| 6,568,534 B2 * | 5/2003 | Zank | A47J 27/12 | 206/508 |
| D483,216 S * | 12/2003 | Siegel | | D7/354 |
| 6,793,193 B2 * | 9/2004 | de Groote | A23G 1/226 | 249/119 |
| 6,802,431 B2 * | 10/2004 | Schinkel | B05C 17/0245 | 220/570 |
| 6,820,541 B2 * | 11/2004 | Siegel | A21B 3/15 | 220/573.2 |
| 6,823,773 B2 * | 11/2004 | Swinford | A47J 37/0694 | 99/426 |
| 6,832,744 B1 * | 12/2004 | Pitt | A47G 23/0241 | 248/146 |
| 7,011,014 B2 * | 3/2006 | Siegel | A21B 3/15 | 220/573.2 |
| 7,059,318 B2 * | 6/2006 | Cornfield | A47J 37/067 | 126/275 R |
| 7,173,225 B2 * | 2/2007 | Chang | A47J 36/12 | 219/438 |
| 7,194,786 B2 * | 3/2007 | Gagne | B44D 3/14 | 16/110.1 |
| D545,630 S * | 7/2007 | Serra | | D7/545 |
| D547,615 S * | 7/2007 | Wasserman | | D7/542 |
| D551,510 S * | 9/2007 | Serra | | D7/500 |
| 7,281,469 B1 * | 10/2007 | Barbour | A47J 43/18 | 211/181.1 |
| D564,828 S * | 3/2008 | Solis | | D7/360 |
| D569,567 S * | 5/2008 | Kohn | | D32/53.1 |
| D586,611 S * | 2/2009 | Solis | | D7/354 |
| D587,063 S * | 2/2009 | Solis | | D7/361 |
| 7,565,863 B2 * | 7/2009 | Tschetter | A47J 37/0694 | 99/419 |
| 7,607,387 B2 * | 10/2009 | Stanczak | A47J 37/108 | 99/422 |
| 7,640,848 B1 * | 1/2010 | Bourgeois | A47J 36/26 | 99/340 |
| D612,119 S * | 3/2010 | Bergman | | D32/54 |
| D613,999 S * | 4/2010 | Sierra | | D7/587 |
| D615,265 S * | 5/2010 | Bergman | | D32/54 |
| D619,319 S * | 7/2010 | Bergman | | D32/54 |
| 7,765,919 B2 * | 8/2010 | Siegel | A21B 3/15 | 99/422 |
| 7,775,156 B2 * | 8/2010 | Sus | A47J 37/1295 | 99/410 |
| D630,393 S * | 1/2011 | Bergman | | D32/54 |
| D630,394 S * | 1/2011 | Bergman | | D32/54 |
| 2002/0106255 A1* | 8/2002 | Edland | F16B 13/0808 | 411/3 |
| 2002/0195001 A1* | 12/2002 | Hester | A47J 37/049 | 99/345 |
| 2005/0235838 A1* | 10/2005 | Cohn | A23L 5/15 | 99/426 |
| 2005/0263013 A1* | 12/2005 | Siegel | A47J 37/01 | 99/426 |
| 2008/0017047 A1* | 1/2008 | Stanczak | A47J 37/108 | 99/357 |
| 2008/0135719 A1* | 6/2008 | Vendl | A47J 37/01 | 249/134 |
| 2009/0260525 A1* | 10/2009 | Jordan | A21B 3/13 | 99/422 |

\* cited by examiner

BAKING PAN FOR TILTED CAKES

FIELD OF THE INVENTION

The present invention relates generally to baking pans for baking cakes and more specifically to a baking pan for baking tilted cakes which are used to construct multi-layer whimsical or mad hatter cakes.

BACKGROUND OF THE INVENTION

Tilted cakes, sometimes referred to as whimsical cakes or mad hatter cakes, are well-known in the cake and cake decorating industry. Such cakes are generally constructed by baking a typical round cake having the desired diameter and height and after the cake has appropriately cooled, preferably after freezing the cake to make it more solid, the cake is sliced at an angle to remove the top section thereof and thus provide a tilted cake. Various additional round cakes of smaller diameters are also baked frozen and also sliced in this matter to provide a plurality of layers all having a tilt to them. Such layers are then assembled one on top of the other typically by cutting a section from the bottom layer to provide a flat surface to receive the next tilted cake layer and then inserting it in place. This process is continued until the cake is appropriately assembled. Thereafter, the cake is decorated in the manner desired to provide the desired appearance.

An alternative method of providing a tilted cake to then be assembled in such layers is to utilize a plurality of flat cakes of varying diameters and heights and then to provide a filling that will remain stiff and hold its form around the outer edge of the bottom layer and then place additional half rings on top of the first tapering off at the ends and building the half rings to a desired height and then placing the next layer after filling in the thus formed reservoir with a desired filling such as a cream or the like to support the top layer. This process is repeated to provide the desired height and differences in diameters for the desired appearance for the whimsical cake.

In all of these instances, it has been found necessary that the cake be very cold even frozen so that it does not break during the cutting and assembling process. Obviously, all of this procedure, irrespective of the type that is utilized, is very time consuming and tedious thus making such cakes extremely expensive if they are manufactured by a commercial bakery. Alternatively, if they are manufactured by an individual at home, an inordinate amount of time is taken to accomplish the task. There therefore exists the need for providing the building blocks for making a tilted or whimsical or mad hatter cake which eliminates the slicing and cutting process and enables more effective and efficient assembly of the various layers of the cake.

SUMMARY OF INVENTION

A baking pan for baking a tilted cake which includes a pan having a sidewall and an upper open rim defining a first plane, a lower enclosed bottom defining a second plane, the second plane is disposed at an angle relative to the first plane thereby causing the side wall of the pan to be shorter on one side as compared to the other, and a means for supporting the pan in a baking oven at a position so that the first plane remains parallel to the surface upon which the pan rests during baking.

DETAILED DESCRIPTION

Figure 1:
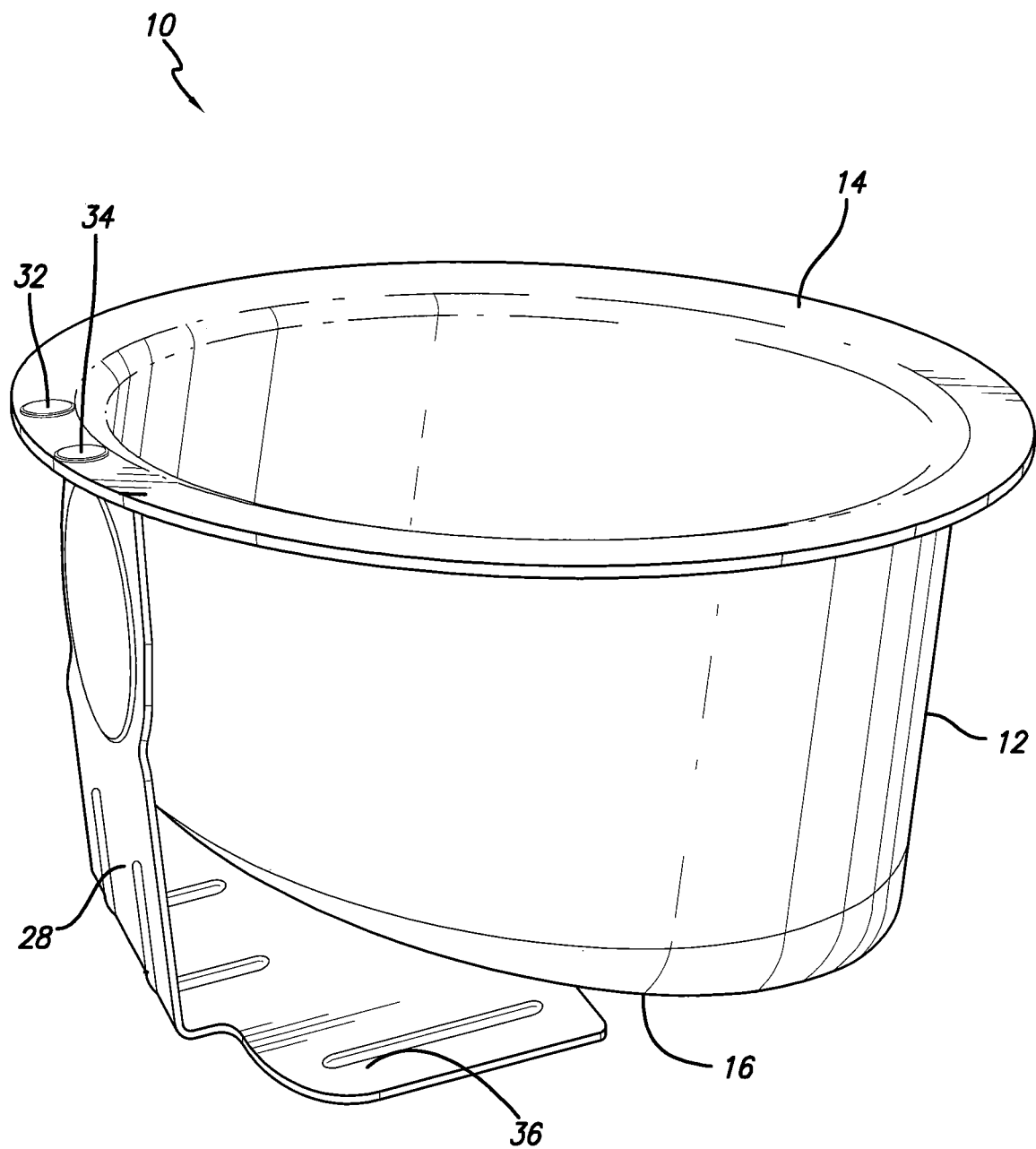
FIG. 1 is a perspective view of a baking pan for a tilted cake constructed in accordance with the principles of the present invention.
Figure 2:
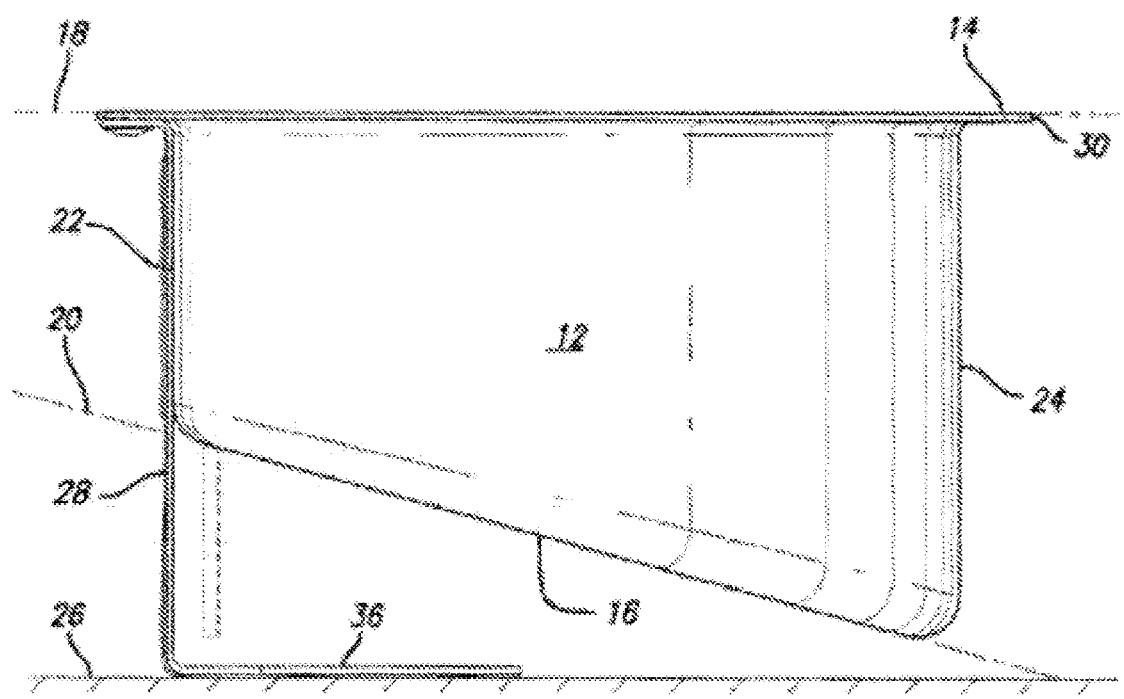
FIG. 2 is a side view of the baking pan as illustrated in FIG. 1.
Figure 3:
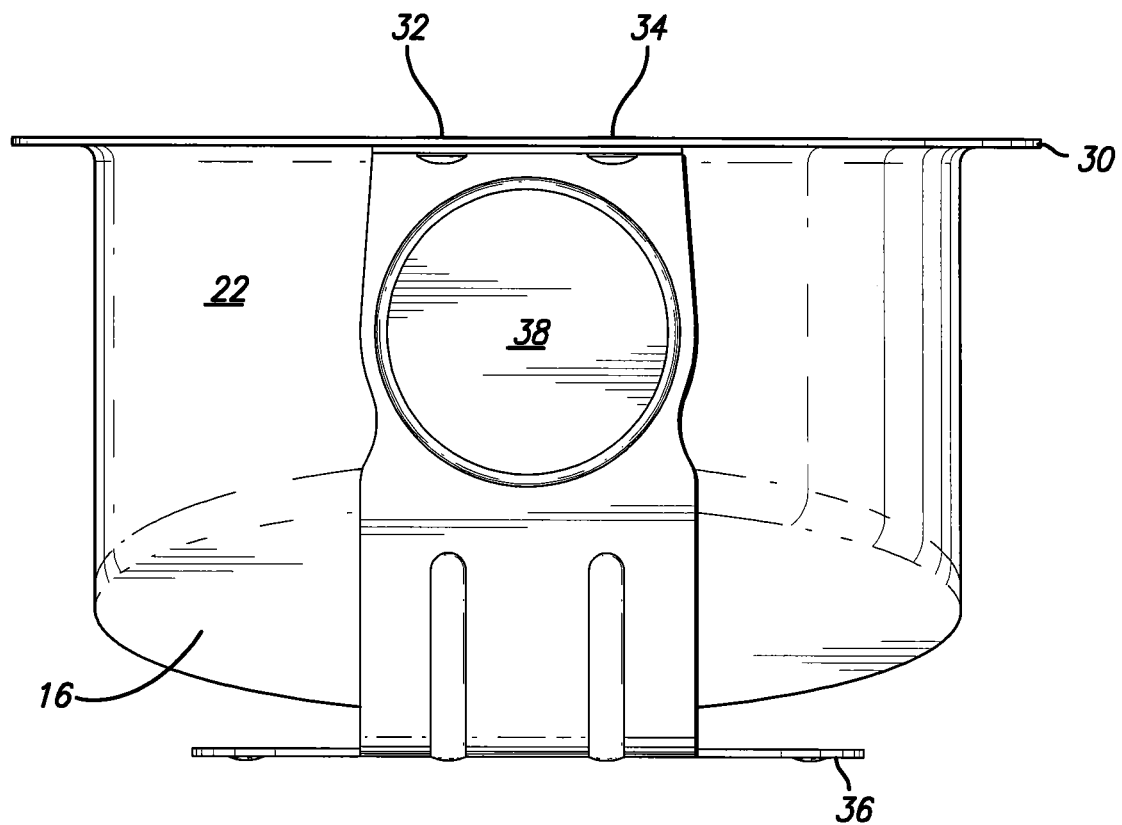
FIG. 3 is a rear view of the baking pan as illustrated in FIG. 1.

Referring now more specifically to FIGS. 1 thru 3, the baking pan 10 constructed in accordance with the principles of the present invention includes a side wall 12, the upper portion of which terminates in an upper open rim 14 and a bottom wall 16. The sidewall is shorter at a first side 22 and is longer at a second side 24 that is on an opposite side of the baking pan 10 from the first side 22. The rim 14 defines a first plane 18 and the bottom wall 16 defines a second plane 20. The plane 20 is angularly disposed with respect to the plane 18 so that the side wall 12 of the pan 10 is substantially shorter at the first side 22 as compared to the opposite second side 24. The planes 18 and 20 intersect at an acute angle 21, which can vary depending on the slope of the plane 20 Through this construction, a cake which is baked by depositing dough internally of the pan 10 will, when removed from the pan 10, have a tilted surface as defined by the plane 20. As a result, there would be no necessity for having to freeze the cake and then slice a portion thereof to provide the tilted section since such would have been provided by the configuration of the pan 10. It would be recognized by those skilled in the art that a plurality of pans having varying diameters and heights could be utilized to thus produce a plurality of layers for the whimsical or mad hatter cake with each of the layers having a different diameter and a different tilt. It should also be recognized that even though an embodiment illustrated in FIGS. 1 through 3 shows a circular pan that any particularly geometric configuration can be utilized that is desired to form a whimsical cake. For example, a pan could be square in shape or oblong in shape and as above indicated may have varying dimensions to provide the sizes of the layers for the whimsical cake.

As is illustrated more specifically in FIG. 2, when the pan 10 is placed within an oven to bake the cake, it will rest upon a surface 26 as schematically illustrated. It is important that the upper portion or rim 14 of the pan be disposed within the oven so that the plane 18 is substantially parallel with the surface 26. To accomplish this, since the bottom of the pan 16 is tilted at an angle to establish the plane 20, there is provided a means, such as a stand, for causing the pan to be disposed such that the first plane 18 remains substantially parallel to the surface 26. In accordance with one embodiment of the present invention, there is provided a stand 28 which is affixed at its upper end 29 to the outwardly directed flange 30 on the rim 14 by appropriate fasteners such as rivets 32 and 34. A foot 36 is directed inwardly from the lower end of the stand 28 under the pan portion to support the pan in the position as shown in FIG. 2 on the surface 26 where the first plane 18 is parallel to the surface 26 and the bottom wall 16 is suspended above and out of contact with the surface 26. Obviously, the stand 28 may be affixed to the flange 30 in other ways than by the rivets 32 and 34 such for example as by welding the same thereto or alternatively welding the arm 38 to the external surface of the wall 12. In the embodiment illustrated in FIGS. 1 and 3, the foot 36 is wider than the upper and lower ends of the stand 28. Also as shown in FIGS. 1 to 3, the inner surface of the pan is continuous, smooth and uninterrupted, particularly in the transition between the side wall and the bottom wall.

As an alternative structure to maintain the plane 18 substantially parallel to the oven surface 26, a pair of legs, one of which is shown by dotted lines 37 may be affixed to the outside bottom edge and spaced apart substantially equivalent from the center of the pan. The end 39 of the leg 37 would rest on the surface 26 and the end 41 of the bottom 16 of the pan would rest on the surface 26. Thus, there would be provided three spaced apart supports for the pan 10 to maintain it in the desired position during baking.

Figure 4:
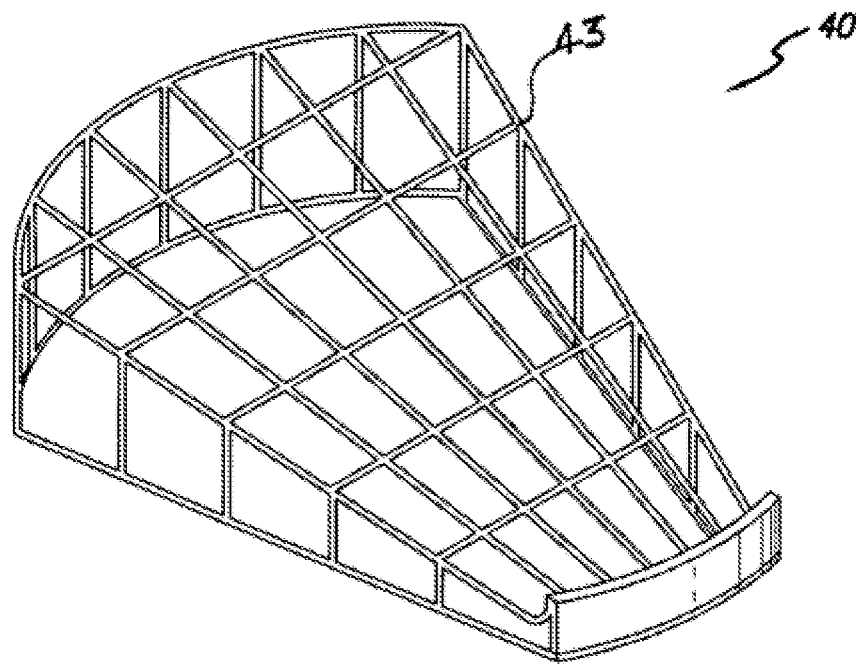
FIG. 4 is a perspective view of a support member for receiving a pan constructed in accordance with the principles of the present invention.
Figure 5:
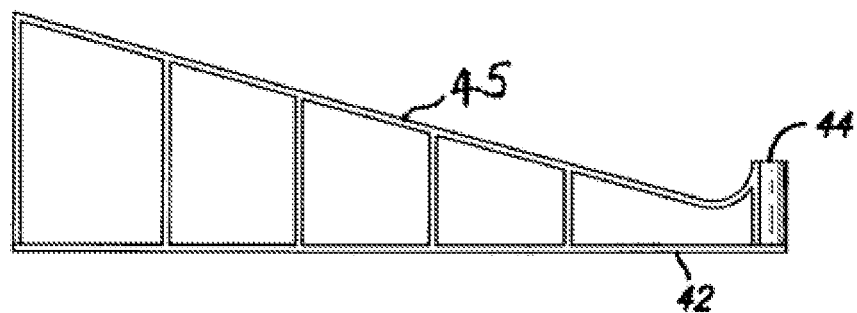
FIG. 5 is a side view of the structure as illustrated in FIG. 4.

Referring now more particularly to FIGS. 4 and 5, the pan without the stand 28 may be placed upon a support member 40 which is a frame constructed of a plurality of inter connected wire 43 or mesh to thus provide a flat surface 42 which would rest upon the surface 26 of the oven. The support member also defines a slanted surface 45 for receiving the bottom of the pan 10. The slanted surface 45 is at an angle with respect to the oven surface 26 which is substantially the same as the angle of the second plane 20. The pan without the stand 28 would then be placed so that the larger side 24 would rest against a lip 44 formed at the bottom of the member 40 thus causing the upper surface forming the plane 18 to be disposed within the oven so that the plane 18 is substantially parallel to the surface 26 within the cover. This structure, obviously, provides two different pieces which are disposed within the oven to support the pan to produce the desired cake.

There has thus been disclosed a baking pan for producing a tilted cake which is simple, easy to utilize and produces a desired tilted cake while eliminating the intensive labor required to freeze and cut the cake to provide the desired layers for a whimsical or mad hatter type cake.

What is claimed is:

1. A baking pan for baking a tilted cake comprising:
   a pan portion comprising a bottom wall and a sidewall,
      wherein the bottom wall is flat and continuous,
      wherein the sidewall extends directly upward from the perimeter of the bottom wall and terminates in an open upper rim,
      wherein the sidewall comprises a first side located on an opposite side of the pan from a second side, the first side having a height shorter than a height of the second side,
      wherein the open upper rim defines a first plane and the bottom wall defines a second plane, and
      wherein the first and second planes intersect at an acute angle; and
   a stand comprising an upper end, a lower end and a foot,
      wherein the upper end of the stand is affixed to the sidewall on a same side as the first side, and
      wherein the foot extends from the lower end of the stand, and
      wherein the foot is configured to rest on a surface thereby maintaining the first plane parallel to the surface and suspending the bottom wall above and out of direct contact with the surface.

2. The baking pan of claim 1, wherein the stand is affixed to the flange only on the same side as the first side.

3. The baking pan of claim 1, wherein the upper end of the stand is affixed to the bottom side of the flange.

4. The baking pan of claim 1, wherein the foot extends partially under the pan.

5. The baking pan of claim 1, wherein the entire bottom wall perimeter is in contact with and encompassed by the sidewall.

6. The baking pan of claim 1, wherein both the first side and the second side of the sidewall extend upwardly from the perimeter of a single continuous flat surface.

7. The baking pan of claim 1, wherein a single continuous bottom wall defines the second plane.

8. The baking pan of claim 1, wherein the stand suspends the pan portion above and out of direct contact with the surface.

9. The baking pan of claim 1, wherein the inner surface of the bottom wall is flat and continuous.

10. The baking pan of claim 1, wherein foot is wider than the upper and lower ends of the stand.

11. The baking pan of claim 1, comprising one stand configured to independently maintain the first plane parallel to the surface and suspending the pan portion above and out of direct contact with the surface.

12. A baking pan for baking a tilted cake comprising:
    a pan portion comprising a bottom wall and a sidewall,
       wherein the bottom wall is flat and continuous,
       wherein the sidewall extends directly upward from the perimeter of the bottom wall and terminates in an open upper rim,
       wherein the sidewall comprises a first side located on an opposite side of the pan from a second side, the first side having a height shorter than a height of the second side,
       wherein the open upper rim defines a first plane and the bottom wall defines a second plane, and
       wherein the first and second planes intersect at an acute angle; and
    a stand comprising an upper end, a lower end and a foot, the stand being disposed externally of the pan portion and adjacent to the first side,
       wherein the upper end of the stand is affixed to the sidewall on a same side as the first side, and
       wherein the foot is configured to rest on a surface thereby maintaining the first plane parallel to the surface and suspending the bottom wall above and out of direct contact with the surface.

13. The baking pan of claim 12, wherein the open upper rim comprises a flange which comprises a top side and a bottom side.

14. The baking pan of claim 13, wherein the flange defines the first plane.

15. The baking pan of claim 13, wherein the upper end of the stand is affixed to the flange.

16. The baking pan of claim 12, wherein the foot extends from the lower end of the stand under the pan portion.

* * * * *